United States Patent [19]

Mamiya et al.

[11] Patent Number: 5,764,322
[45] Date of Patent: Jun. 9, 1998

[54] LIGHT GUIDING SHEET, MANUFACTURING METHOD THEREOF, BACK LIGHT USING THE LIGHT GUIDING SHEET, AND LIQUID CRYSTAL DISPLAY UNIT USING THE BACK LIGHT

[75] Inventors: Johji Mamiya, Kunitachi; Masaru Suzuki, Yokohama; Yoshinori Momose, Sagamihara, all of Japan

[73] Assignee: International Business Machines Corporation, Armonk, N.Y.

[21] Appl. No.: 668,948

[22] Filed: Jun. 24, 1996

[30] Foreign Application Priority Data

Jun. 22, 1995 [JP] Japan .................. 7-155735

[51] Int. Cl.$^6$ .................. G02F 1/1335; G09F 13/04
[52] U.S. Cl. .................. 349/65; 349/98; 349/113; 349/117; 349/67; 359/488; 362/31; 385/901
[58] Field of Search .................. 349/61, 96, 62, 349/117, 64, 113, 65, 70; 362/26, 19, 31, 224, 331, 332; 385/901, 11, 131, 130, 146, 129; 359/487, 488, 494, 495, 498

[56] References Cited

U.S. PATENT DOCUMENTS

| | | | |
|---|---|---|---|
| 4,384,764 | 5/1983 | Tischer et al. | 349/162 |
| 4,798,448 | 1/1989 | van Rattle | 349/62 |
| 5,157,526 | 10/1992 | Kondo et al. | 349/62 |
| 5,161,873 | 11/1992 | Obata et al. | 362/31 |
| 5,390,276 | 2/1995 | Tai et al. | 385/901 |
| 5,528,720 | 6/1996 | Winston et al. | 385/146 |
| 5,546,481 | 8/1996 | Meltz et al. | 385/11 |
| 5,557,433 | 9/1996 | Maruyama et al. | 349/112 |
| 5,587,816 | 12/1996 | Gunjima et al. | 349/62 |

*Primary Examiner*—William L. Sikes
*Assistant Examiner*—Tai Van Duong
*Attorney, Agent, or Firm*—Ronald L. Drumheller

[57] ABSTRACT

A liquid crystal display unit using a back light uses a light guiding sheet to transfer to a liquid crystal display panel the light from a light source, and provides a liquid crystal display unit where a display of images is obtained with uniform brightness and high brightness. The light guiding sheet is formed by stacking two or more kinds of transparent amorphous layers different in refractive index at a predetermined angle with respect to a sheet surface. This light guiding sheet is constructed so as to be employed in a back light.

15 Claims, 9 Drawing Sheets where $n_n \begin{cases} =1.58(n=2m) \\ =1.49(n=2m+1) \end{cases}$ $t_n = 60 \mu m$
$\theta_n = 45°$
$h = 0.5mm$ where
$$n_n \begin{cases} =1.58 (n=2m) \\ =1.49 (n=2m+1) \end{cases}$$

$t_n = 60 \mu m$ $\theta_n = 45°$ $h = 0.5 mm$

FIG. 3
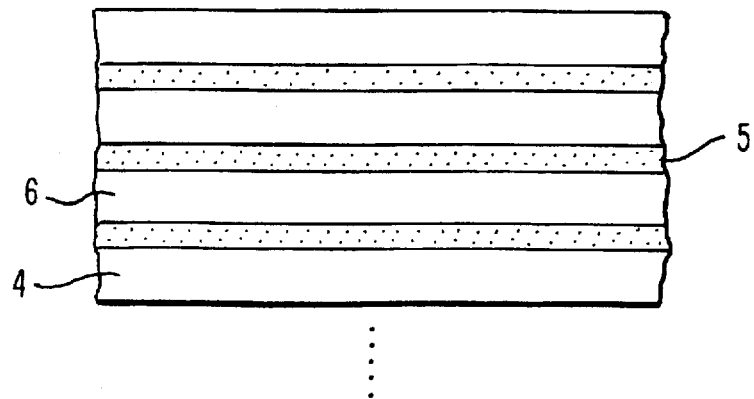
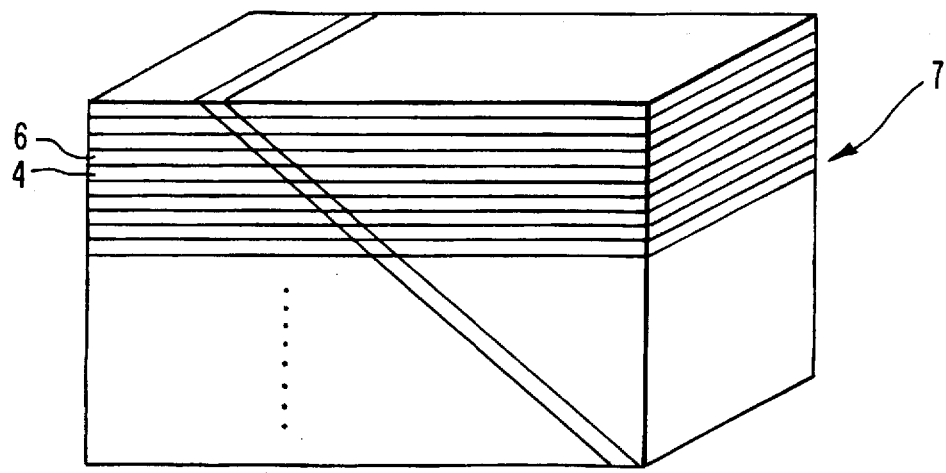
FIG. 4(a)
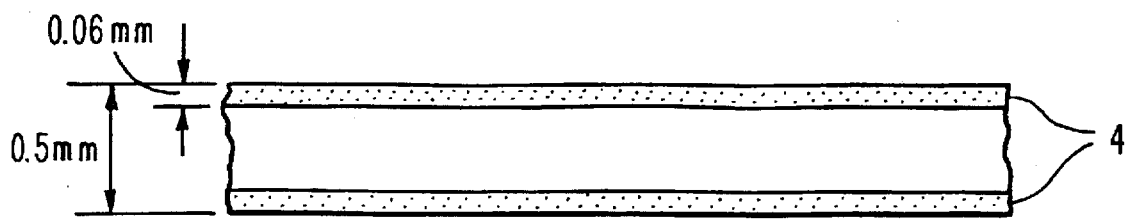
FIG. 4(b)

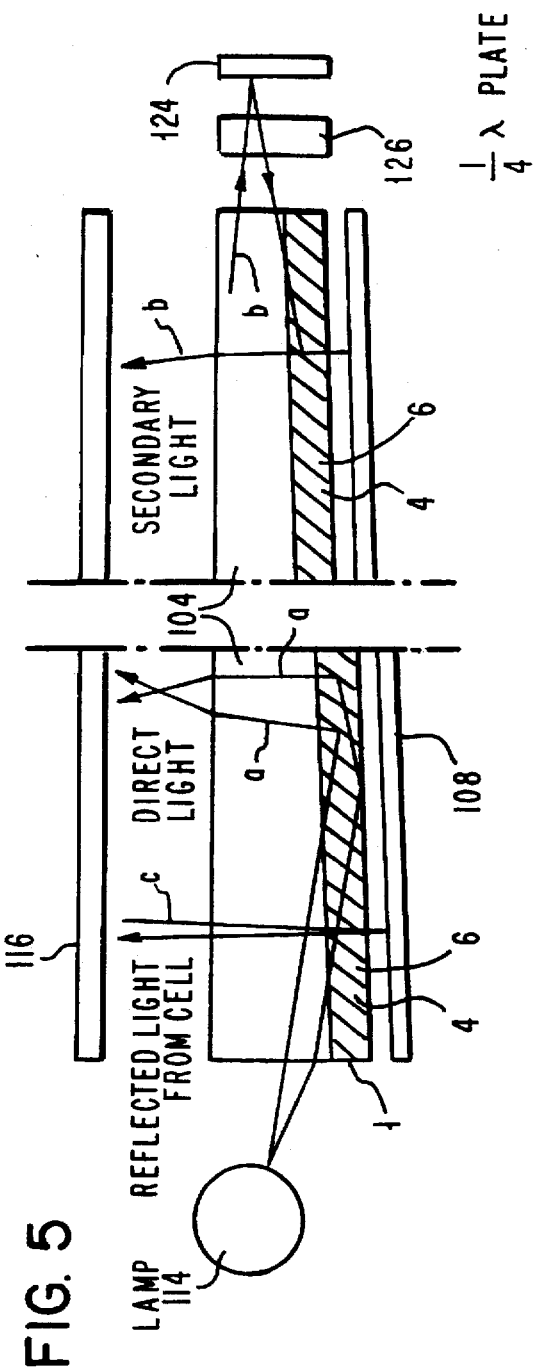
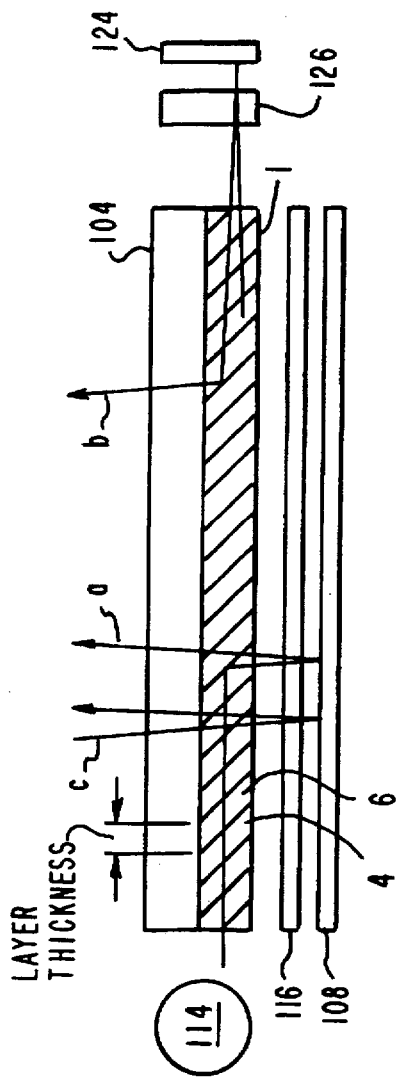

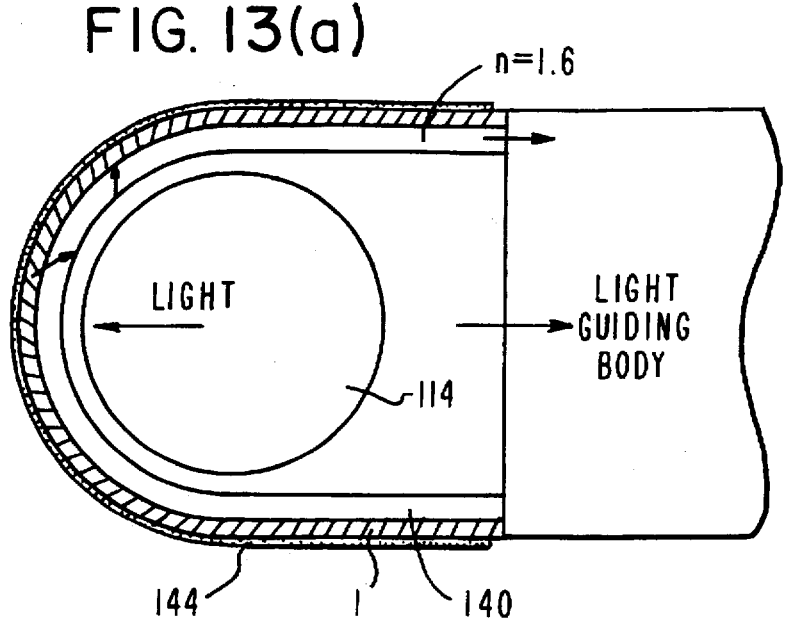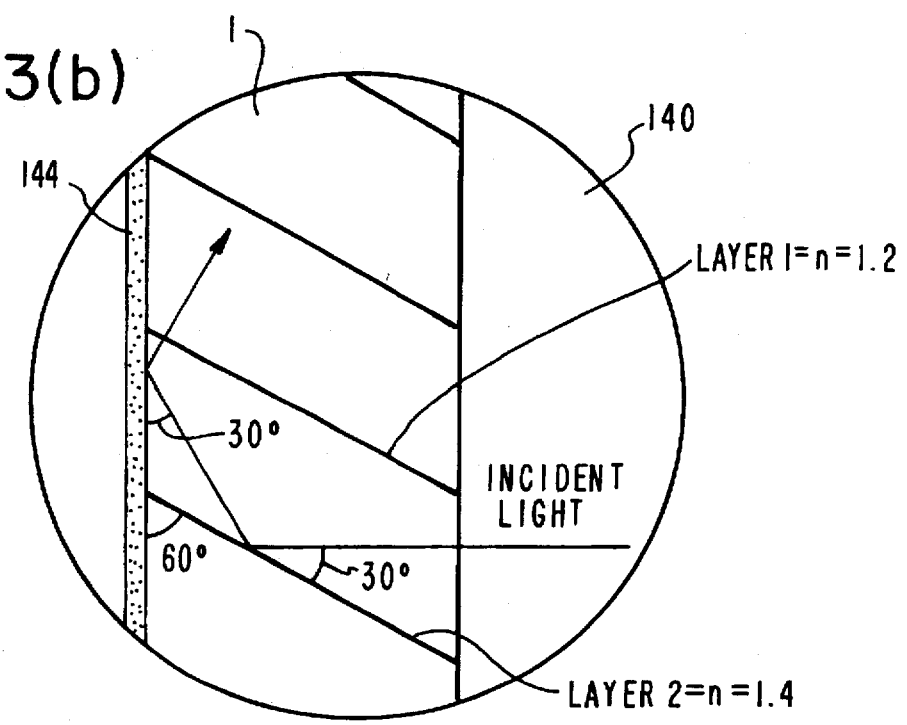

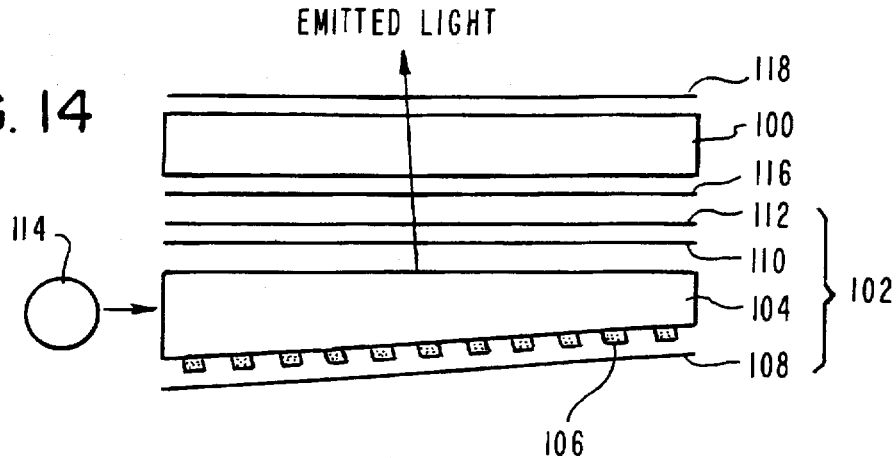
FIG. 14
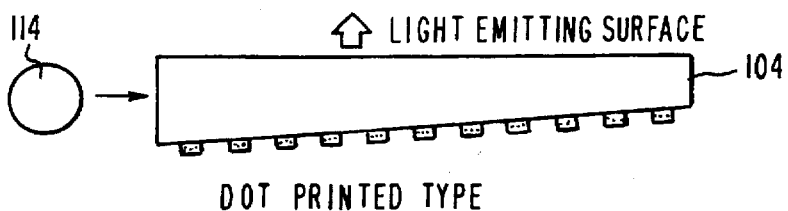
FIG.15(a) DOT PRINTED TYPE
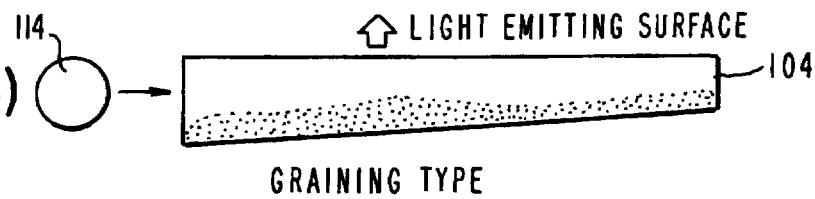
FIG.15(b) GRAINING TYPE
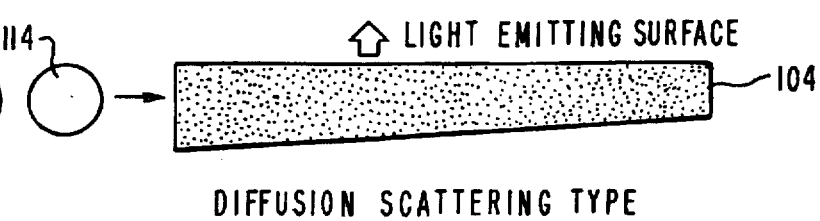
FIG.15(c) DIFFUSION SCATTERING TYPE
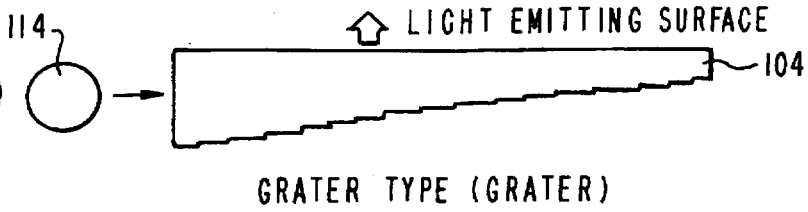
FIG.15(d) GRATER TYPE (GRATER)

LIGHT GUIDING SHEET, MANUFACTURING METHOD THEREOF, BACK LIGHT USING THE LIGHT GUIDING SHEET, AND LIQUID CRYSTAL DISPLAY UNIT USING THE BACK LIGHT

BACKGROUND OF THE INVENTION

1. Field of the Invention

The present invention is utilized in the back light of a liquid crystal display unit, and relates to a light guiding sheet which causes the light from a light source to be transmitted to a liquid crystal display panel and also relates to a method of manufacturing the light guiding sheet. Further, the invention relates to a back light using the light guiding sheet and a liquid crystal display unit using the back light.

2. Related Art

A large number of liquid crystal display panels have recently been employed as a display unit for personal computers or word processors. Also, liquid crystal television sets have been widely used, and in order to enhance their picture qualities of display, the demands for the uniform and high brightness of the liquid crystal screen are being increased.

The structure of a conventional transmissive type liquid crystal display unit will be described with FIG. 14. A liquid crystal display panel 100 is formed by enclosing liquid crystal between two upper and lower glass substrates opposed with a predetermined cell gap, and the liquid crystal is driven by applying a voltage to the liquid crystal by electrodes formed in the inner surfaces of the two upper and lower glass substrates. The molecules of the enclosed liquid crystal are twisted and arranged in the up-down direction by about 90° or 270°. On both surfaces of the liquid crystal display panel 100 there are provided polarizing plates 116 and 118. A back light 102 is attached to the back surface of the liquid display panel 100 so that light is supplied to the panel.

The structure of the back light 102 will be described. There is provided, for example, a light guiding body 104 of acrylic resin which has a wedge-shaped section and a flat surface opposed to the back surface of the liquid crystal display panel 100. A line-shaped light source 114 of cold cathode tube is attached along the proximal portion of the wedge-shaped section of the light guiding body 104. The light guiding body 104 is provided for emitting the incident light from the line-shaped light source 114 toward the liquid crystal display panel 100.

On the back surface of the light guiding body 104 of FIG. 14 there is a printed dot pattern for diffusely reflecting light that propagates through the light guiding body 104. A reflecting sheet 108 is attached to the entire back surface of the light guiding body 104. A light diffusing plate 110 and one or two prism sheets 112 are provided between the polarizing plate 116 and the light guiding body 104. The light having a brightness distribution, emitted from the light guiding body 104, is diffused and made more uniform with a light diffusing plate 110. After passing through the one or two prism sheets 112, the diffused light is condensed in a predetermined direction and incident at a predetermined angle of emission on the liquid crystal display panel 100.

The light guiding method of the light guiding body which has so far been used in a back light will be described with FIG. 15. In the figure, for example, a light guiding body 104 made of acrylic resin has a rectangular flat surface and a wedge-shaped section. On the longer end side surface of the opposite ends of this wedge-shaped section there is attached a light source, such as a line-shaped light source 114 of cold cathode tube.

FIG. 15(a) shows a light guiding body 104 called a dot printed type which is the same as the one shown in FIG. 14. On the back surface of the light guiding body 104 a dot pattern 106 is formed in ink having a refractive index substantially equal to or higher than that of the light guiding body 104. With this dot pattern 106, the light incident through the light guiding body 104 is diffused and guided to the upper surface of the light guiding body 104.

FIG. 15(b) shows a light guiding body 104, which is what is called a graining type. A metal mold for forming the light guiding body 104 is grained, and the back surface of the light guiding body 104 is formed with very small roughness for light FIG. 15(c) shows a light guiding body 104 called a diffusion scattering type. In this type, diffusion and reflection are performed by mixing up two or more kinds of acrylic resins different in refractive index.

FIG. 15(d) shows a light guiding body 104 called a grater type. A light reflecting surface of configuration just as a grater is formed on the back surface of the light guiding body 104.

A description will be made of a display brightness and a brightness distribution in a case where a back light having the conventional light guiding body described above is used in a liquid crystal display panel.

Polarized light needs to be incident on the liquid crystal molecules, enclosed in the liquid crystal display panel 100 and twisted and arranged by about 90° or 270°. However, since none of the above-described light guiding bodies 104 can emit polarized light, it is indispensable to provide the polarizing plate 116 between the light guiding body 104 and the liquid crystal display panel 100.

Also, since the light emitted from the light guiding body 104 to the panel direction has not been diffused and made uniform sufficiently, it is necessary to provide the light diffusing plate 110 between the polarizing plate 116 and the light guiding body 104, and further it is also necessary to provide one or two prism sheets 112 in order to condense light in a predetermined direction.

The brightness of the liquid crystal display unit having the above-described back light will be described with FIG. 16. If it is assumed that the brightness of the light, just emitted from the light guiding body 104, is 1000 cd/m$^2$, this light will pass through the light diffusing plate 110 and the prism sheet 112 and be condensed in a predetermined direction of angle of emission, and the brightness of the light will become 1900 cd/m$^2$ of about 1.9 times.

Next, the light, by passing through the polarizing plate 116, is polarized at a predetermined angle, then a light quantity of about 55% will be lost, and the light with a light quantity of 855 cd/m$^2$ will be incident on the liquid crystal display panel 100. Within the liquid crystal display panel 100, a constant quantity of light is lost due to the aperture efficiency (0.65 in this case) which is determined by a light shielding layer (black matrix) provided in the boundary between pixels, and a quantity of light is reduced to 556 cd/m$^2$. Further, if the light passes through a color filter of three primary colors (red, blue, and green) for color display, then the quantity of light will be reduced to 0.33 times, and finally the light of 1000 cd/m$^2$, emitted from the light guiding body 104, will be reduced to 183 cd/m$^2$.

Thus, if the back light and liquid crystal display panel of the conventional structure are used, there will occur the problem that the light from a light source cannot be transferred sufficiently and efficiently.

Also, the conventional back light structure has the disadvantage that the thickness is relatively thick and therefore it is difficult to make the back light thin in correspondence with the reduction in the size of the above-described personal computers or word processors.

SUMMARY OF THE INVENTION

A first object of the present invention is to provide a light guiding sheet which is capable of efficiently transmitting the light from a light source.

Also, a second object of the present invention is to provide a back light which is capable of efficiently transmitting the light from a light source.

Further, a third object of the present invention is to provide a thin back light which can correspond to the miniaturization of a system.

Also, a fourth object of the present invention is to provide a liquid crystal display unit which is capable of displaying images with uniform brightness and high brightness.

The foregoing first object is accomplished by a light guiding sheet for guiding, converting to a desired direction, and emitting incident light, wherein two or more kinds of transparent amorphous layers different in refractive index are stacked at a predetermined angle with respect to a sheet surface.

Also, the foregoing first object is accomplished by the light guiding sheet wherein a thickness of each of the amorphous layers has a predetermined layer thickness distribution in a stacked direction of the amorphous layers, and by the light guiding sheet wherein the layer thickness distribution is a layer thickness distribution such that an intensity distribution of light that is emitted from the sheet surface becomes mountainous with a center of the sheet surface as a mountaintop, or by the light guiding sheet wherein the layer thickness distribution is a layer thickness distribution such that a strength distribution of light that is emitted from the sheet surface becomes flat.

Also, the foregoing first object is accomplished by the light guiding sheet wherein the predetermined angle has a predetermined angle distribution for each of the amorphous layers, and by the light guiding sheet wherein the predetermined angle distribution is a distribution where an angle of a central portion of the sheet surface and an angle of a peripheral portion of the sheet surface are different.

The foregoing second object is accomplished by a back light comprising a light guiding sheet and a light source provided in one end portion of the light guiding sheet.

Also, the foregoing second object is accomplished by the back light wherein an angle of each of the amorphous layers is an angle which causes light: from the light source to be reflected directly to a liquid crystal display panel side, a reflecting plate is attached to a surface of the light guiding sheet opposite to the liquid crystal display panel side, and a λ/4 plate and the reflecting plate are provided in an end surface of the other end portion of the light guiding sheet in the recited order.

Further, the foregoing second object is accomplished by the back light wherein an angle of each of the amorphous layers is an angle which does not cause light from the light source to be reflected directly to a liquid crystal display panel side, a polarizing plate and a reflecting plate are attached to a surface of the light guiding sheet opposite to the liquid crystal display panel side in the recited order, and a λ/4 plate and the reflecting plate are provided in an end surface of the other end portion of the light guiding sheet in the recited order.

Further, the foregoing second object is accomplished by the back light wherein a light guiding body is provided on the liquid crystal display panel side of the light guiding sheet.

The foregoing third object is accomplished by the back light wherein a transparent substrate of the liquid crystal display panel is employed instead of the light guiding body.

Also, the foregoing third object is accomplished by a back light comprising a light source where the periphery is surrounded by the light guiding sheet.

The foregoing fourth object is accomplished by a liquid crystal display unit provided with any one of the above-described back lights.

Also, the foregoing fourth object is accomplished by a method of manufacturing a light guiding sheet, comprising the steps of: bonding and stacking films of predetermined refractive index and predetermined thickness in sequence with an adhesive agent to form a film stacked body of generally rectangular parallelepipedic shape; and obliquely cutting the film stacked body to a predetermined thickness at a predetermined angle.

In the light guiding sheet, which guides, converts to a desired direction, and emits incident light, two or more kinds of transparent amorphous layers different in refractive index are stacked according to the present invention at a predetermined angle with respect to a sheet surface. Therefore, if this light guiding sheet is utilized as a back light, the light utilization efficiency of the light guiding body portion of the back light will be able to be enhanced. In addition, since polarized light can be generated in advance at the light guiding body portion, the light which has so far been absorbed by a polarizing plate can be reduced and the light utilization efficiency can be further enhanced. Further, an utilization efficiency of back light can be enhanced by using this light guiding sheet in the periphery of the light source of the back light. Further, the emission angle of the light from the liquid crystal display panel can be controlled so that a characteristic of visual angle is improved.

Also, the back light can be constructed so that direct light is incident on the glass substrate of the liquid crystal display panel without employing the light guiding body of the conventional back light. Further, since the light guiding sheet itself serves as the light guiding body, it can be used instead of the light guiding body, so the back light can be made extremely thin.

BRIEF DESCRIPTION OF THE DRAWINGS

FIG. 3 is a diagram showing a method of manufacturing the light guiding sheet of the first embodiment of the present invention;

FIGS. 4(a)–4(b) are diagrams showing a method of manufacturing the light guiding sheet of the first embodiment of the present invention;

FIG. 5 is a diagram showing a back light of a first embodiment of the present invention;

FIG. 6 is a diagram showing a back light of a second embodiment of the present invention;

FIGS. 13(a)–13(b) are diagrams showing a structure where the back surface light of a light source is propagated to a light guiding body with the light guiding sheet;

FIG. 14 is a diagram used to explain the structure of a conventional liquid crystal display unit;

FIGS. 15(a)–15(d) are diagrams used to explain a conventional light guiding body.

DESCRIPTION OF THE PREFERRED EMBODIMENTS

Embodiments of a light guiding sheet of the present invention, a manufacturing method thereof, a back light using the light guiding sheet, and a liquid crystal display unit using the back light will hereinafter be described with FIGS. 1 to 13.

Figure 1:
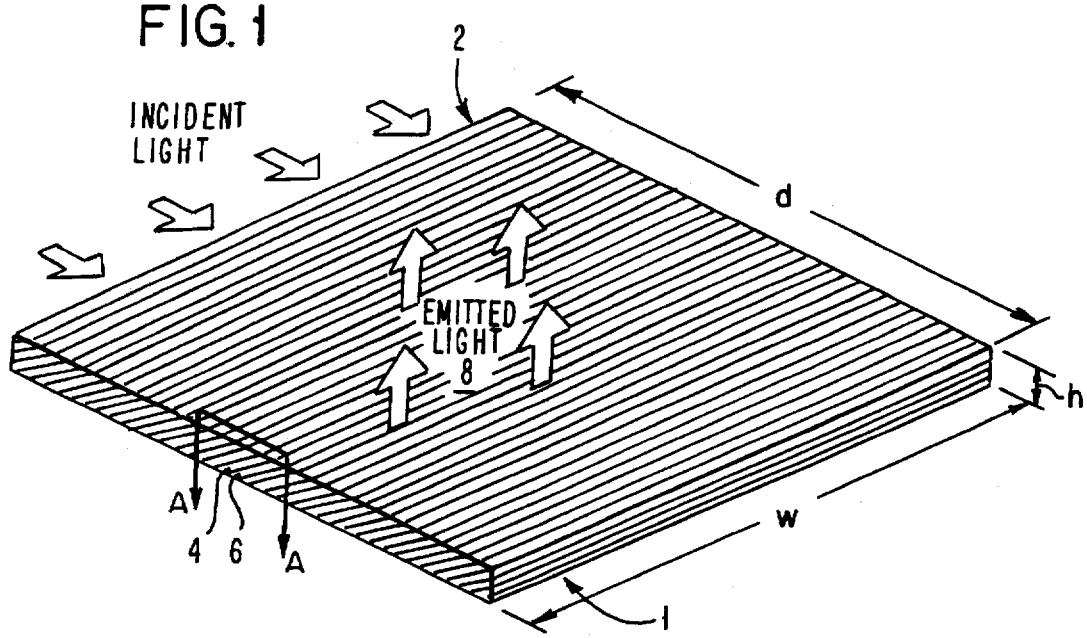
FIG. 1 is a perspective view showing a light guiding sheet of a first embodiment of the present invention.
Figure 2:
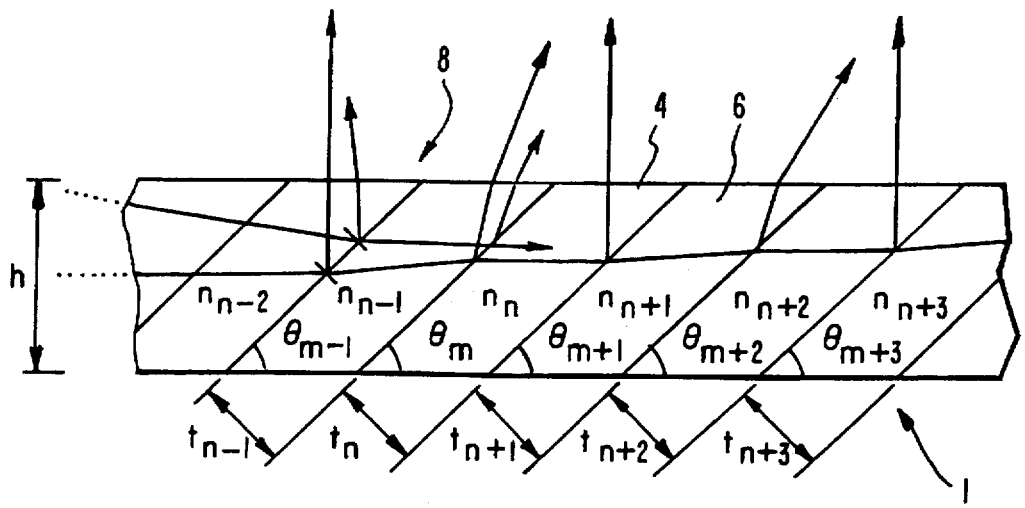
FIG. 2 is a sectional view of the light guiding sheet of the first embodiment of the present invention taken along line A—A of FIG. 1.

First, a preferred embodiment of the light guiding sheet structure of the present invention will be described with FIGS. 1 and 2. FIG. 1 is a perspective view of the light guiding sheet in this embodiment. FIG. 2 is a part sectional view taken by line A—A of FIG. 1. In the light guiding sheet 1 of this embodiment, two or more kinds of transparent amorphous layers different in refractive index are stacked at a predetermined angle with respect to a sheet surface 8, as shown in FIGS. 1 and 2. The transparent amorphous layer used herein means inorganic material such as glass, an organic film of such as acryl, polyethylene, and polycarbonate, and a thin film of inorganic material such as blende, calcium fluoride, and crystal stone.

The refractive index n, the film thickness t, the angle of inclination Θ with respect to a sheet surface, and the sheet thickness h of each amorphous layer can be suitably changed according to various design conditions needed when this light guiding sheet 1 is utilized in the back light of a liquid crystal display unit, for example, a necessary quantity of light, a light-quantity distribution on a sheet surface, and a light-condensing characteristic.

The sectional view of the light guiding sheet 1 shown in FIG. 2 shows a light guiding sheet 1 where two kinds of film materials with refractive indexes of 1.58 and 1.49, for example, films 4 and 6 of thickness t=60 μm comprising a polycarbonate film and an acrylic film are stacked at angle of Θ=45° with respect to a sheet surface without an air layer. The thickness h of the light guiding sheet 1 is 0.5 mm. The shape of the light guiding sheet 1 in this embodiment is a rectangular parallelepipedic shape where the thickness is thin, and the width, w, is 22 cm and the depth, d, is 16 cm.

Therefore, 950 sheets of amorphous films 4 and 6 are alternately stacked in the depth direction. The thickness of the amorphous layer should be thin enough so that the layer cannot be recognized as a line when it is directly looked at with human eyes, and it is preferable that the layer thickness be 200 μm or less. Also, it is preferable that the distribution of the refractive index of the amorphous layers of the light guiding sheet 1 be between 1.1 and 3.0.

With the light guiding sheet 1 having a structure such as this, if light is incident from one end 2 of this light guiding sheet 1, then part of the incident light guided through the light guiding sheet will be reflected at the boundary surface between the films 4 and 6 and emitted from the light guiding sheet surface 8, and the remaining part will be refracted at the boundary surface and go through the light guiding sheet 1. Also, when light is incident from the light guiding sheet surface 8, the light can be taken out from the one end 2 of the light guiding sheet 1 by an inverse law.

Now consider a case where the light traveling through the light guiding sheet 1 is divided into a S-polarized light and a P-polarized light. For example, when films where the refractive indexes are 1.53 and 1.50 are stacked at an angle of Θ=45°, the reflectance ratio of the S-polarized component is 0.037725 and the reflectance ratio of the P-polarized component is 0.000014. Therefore, the reflection of the S-polarized component is about 2650 times that of the P-polarized component.

Now, a method of manufacturing the light guiding sheet 1 of this embodiment will be described with FIGS. 3 and 4.

As shown in FIG. 3, films 4 and 6 with a predetermined refractive index and a predetermined thickness are bonded with an adhesive agent 5 and stacked. In reality, the thickness of the film needs to be 60 μm or more for the manufacturing reason of the limit of the film thickness available for mass production. Also, it is preferable that the thickness of the adhesive agent 5 for bonding films be 0.5 μm or more (normally 5 to 30 μm) where no optical film interference occurs.

Several hundreds to several thousands of necessary films stacked in this way are formed, for example, into a rectangular parallelepipedic shape having a height of about 10 cm (FIG. 4(a)). Then, a film stacked body 7 of rectangular parallelepipedic shape is obliquely cut at a desired angle to complete a desired light guiding sheet 1 having a desired s thickness. In an example shown in FIG. 4(b), films of, example, thickness 0.06 mm are bonded on the upper and lower surfaces of the light guiding sheet 1 formed to a thickness of 0.5 mm. Since the light guiding sheet 1 can be formed like this, it can be bent or curved for use.

Now, an embodiment of the back light, which is formed by attaching the above-described light guiding sheet to a conventional light guiding body, will be described with FIGS. 5 and 6.

With FIG. 5, the structure of the back light using the light guiding sheet 1 will be described as a first embodiment of the present invention. The back light shown in FIG. 5 is a back light where instead of the dotted pattern shown in FIG. 14 the light guiding sheet 1 of this embodiment has been attached to the back surface of the light guiding body 104 of FIG. 14 where the section is a wedge shape. And, a line-shaped light source 114, for example, a cold cathode tube is attached to one end of the wedge-shaped section of the light guiding body 104. A reflecting plate 124 is attached to the other end of the wedge-shaped section through a λ/4 plate 126. While the light guiding body having a wedge-shaped section has been used in this embodiment, a light guiding body of parallel flat plate shape may be used.

Although omitted in the illustration of FIG. 5, the glass substrate of a liquid crystal display panel is positioned on the upper surface of the light guiding body 104. Between the light guiding body 104 and the glass substrate, only the polarizing plate 116 is provided, and the diffusing plate 110 and the prism sheet 112 are removed because they are unnecessary.

As shown in FIG. 5, each boundary surface between the films 4 and 6, which are the stacked amorphous layer of the light guiding sheet 1, is attached to the back surface of the light guiding body 104 at an angle of 45° with respect to the surface of the light guiding body 104 in the direction from lower left to upper right so that the light reflected at the boundary surface is directed toward the glass substrate side of the liquid crystal display panel. A light reflecting plate 108 is attached to the back surface of the light guiding sheet 1.

The refractive indexes of the stacked films of the light guiding sheet 1 are alternately 1.53 and 1.58. The refractive index of the light guiding body 104 is 1.49 (for example, acrylic resin) slightly smaller than those of the stacked films of the light guiding sheet 1. If the refractive index of the light guiding body 104 is smaller than the maximum value of the refractive indexes of the stacked films of the light guiding sheet 1, there is no problem, but it is preferable that the refractive index of the light guiding body 104 be smaller than the minimum value of the refractive indexes of the stacked films.

Now, the operation will be described. The light, emitted from the light source 114, is incident on the light guiding body 104 and propagates through the light guiding body 104. At this time, the light which propagates through the light guiding body 104 is refracted and incident on the light guiding sheet 1 whose refractive index is slightly greater, and the light is reflected at the boundary surface of each film and travels directly toward the glass substrate (light path, a, of FIG. 5). The light reflected directly by the light guiding sheet 1 has a large number of S-polarized components, and many of the S-polarized components are incident on the glass substrate of the liquid crystal panel by the polarizing plate 116 which allows the S-polarized light to pass through.

Then, the light propagating through the light guiding body 104 includes a quantity number of P-polarized light relatively, and P-polarized light reaches the other end of the light guiding body 104, passes through the λ/4 plate 126, is reflected by the reflecting plate 124, again passes through the λ/4 plate 126, and returns into the light guiding body 104. At this time, since the light passes through the λ/4 plate 126 twice, it has been converted from P-polarized light into S-polarized light. The light converted to the S-polarized light is refracted and incident on the light guiding sheet 1 from the light guiding body 104, and then the light is reflected at the boundary surface of each film layer and emitted toward the glass substrate from the light reflecting plate 108 of the back surface (light path, b, of FIG. 5). This light includes a large number of S-polarized components, so it can pass through the polarizing plate 116 and get to the glass substrate.

Further, the light, which has reached the glass substrate but reflected by the glass substrate, again travels through the light guiding body 104 and is reflected toward the glass substrate by the reflecting plate 108 because, unlike the conventional back light, the back light of this embodiment does not have the diffusing plate and the prism sheet (light path, c, of FIG. 5).

Thus, according to this embodiment of the present invention, since instead of the dotted pattern the light guiding sheet 1 15 where each stacked film is inclined at angel of 45° to the light guiding body 104 has been attached to the back surface of the light guiding body of the conventional back light and also the λ/4 plate 126 and the reflecting plate 124 have been attached to the end surface of the light guiding body 104, the quantity of the light that is vertically emitted from the surface of the light guiding body 104 can be increased and the light-guiding efficiency of the light guiding body portion of the back light can be enhanced. Also, even when no prism sheet is used, the emission angle of the light from the liquid crystal display panel can be controlled so that a characteristic of visual angle is improved.

FIG. 6 shows a second embodiment of the present invention where a light guiding plate of rectangular parallelepipedic shape is used and the amorphous layers of a light guiding sheet are stacked at an angle where primary light from a lamp is reflected to the back surface side of the light guiding sheet.

The structure of a back light using the light guiding sheet 1 of the second embodiment will be described with FIG. 6. The back light shown in FIG. 6 is a back light where instead of the dot pattern shown in FIG. 14 the light guiding sheet 1 of this embodiment has been attached to the back surface of the light guiding body 104 of FIG. 14 where the section is a wedge shape. And, a line-shaped light source 114, for example, a cold cathode tube is attached to one end of the light guiding body 104, and a is reflecting plate 124 is attached to the other end through a λ/4 plate 126. While the light guiding body having a rectangular parallelepipedic shape (parallel flat plate) has been used in the embodiment, a light guiding body having a wedge-shaped section may be used.

Although omitted in the illustration of FIG. 6, the glass substrate of a liquid crystal display panel is positioned on the upper surface of the light guiding body 104. Between the Light guiding body 104 and the glass substrate, the polarizing plate 116, the diffusing plate 110, and the prism sheet 112 are removed because they are unnecessary. In the case of the back light of this embodiment, the polarizing plate 116 is provided on the back surface of the light guiding sheet 1.

As shown in FIG. 6, each boundary surface between films 4 and 6, which are the stacked amorphous layer of the light guiding sheet 1, is attached to the back surface of the light guiding body 104 at an angle of 45° with respect to the surface of the light guiding body 104 in the direction from upper left to lower right so that the light reflected at the boundary surface is incident on a reflecting plate 108 attached to the back surface of the light guiding sheet and then the reflected light is directed toward the glass substrate side of the liquid crystal display panel. The light reflecting plate 108 is attached to the back surface of the light guiding sheet 1 through the polarizing plate 116.

The refractive indexes of the stacked films of the light guiding sheet 1 are alternately 1.50 and 1.53. The refractive index of the light guiding body 104 is 1.49 (for example, acrylic resin) slightly smaller than those of the stacked films of the light guiding sheet 1. The relationship between the refractive index of the light guiding body 104 and the refractive indexes of the stacked films of the light guiding sheet 1 is the same as the first embodiment.

Now, the operation will be described. The light, emitted from the light source 114, is incident on the light guiding body 104 and propagates through the light guiding body 104. At this time, the light which propagates through the light guiding body 104 is refracted and incident on the light guiding sheet 1 whose refractive index is slightly greater, and then the light is reflected at the boundary surface of each film, passes through the polarizing plate 116, is reflected by the reflecting plate 108, again passes through the polarizing plate 116, and is incident on the glass substrate as S-polarized light (light path, a, of FIG. 6).

Then, the light propagating through the light guiding body 104 includes a large quantity of P-polarized light relatively, and the P-polarized light reaches the other end of the light guiding body 104, passes through the λ/4 plate 126, is reflected by the reflecting plate 124, again passes through the λ/4 plate 126, and returns into the light guiding body 104. At this time, since the light passes through the λ/4 plate 126 twice, it has been converted from P-polarized light into S-polarized light. The light converted to the S-polarized light is refracted and incident on the light guiding sheet 1 from the light guiding body 104, and then the light is reflected at the boundary surface of each film layer and emitted toward the glass substrate (light path, b, of FIG. 6).

Further, the light, which has reached the glass substrate but reflected by the glass substrate, again travels through the light guiding body 104 and is reflected toward the glass substrate by the reflecting plate 108 because, unlike the conventional back light, the back light of this embodiment does not have the diffusing plate and the prism sheet (light path, c, of FIG. 6).

Thus, since instead of the dot pattern the light guiding sheet 1 where each stacked film is inclined at angle of 45° relative to the light guiding body 104 has been attached to the back surface of the light guiding body of the conventional back light and also the λ/4 plate 126 and the reflecting plate 124 have been attached to the end surface of the light guiding body 104, the quantity of the light that is vertically emitted from the surface of the light guiding body 104 can be increased and the light-guiding efficiency of the light guiding body portion of the back light can be enhanced. Also, the emission angle of the light from the liquid crystal display panel can be controlled so that a characteristic of visual angle is improved.

Now, the brightness distribution of the light guiding sheet and the control of the layer thickness of the stacked films constituting the light guiding sheet will be described with reference to FIG. 7. In the above-described first and second embodiments where the layer thickness of each of the stacked films of the light guiding sheet 1 is constant, the portion of the brightness distribution closer to the light source 114 becomes brighter.

If in this case the transmittance factor of each layer is expressed by T and the number of the layer from the vicinity of the light source is expressed by n (T<1, n=1, 2, 3 . . . ), the brightness of the nth layer will be given by Equation (1).

$$L(n)=L_0 \cdot T^n \quad (1)$$

where L(n) represents the brightness of the nth layer and $L_0$ represents the brightness of the light source.

For example, when a completely uniform brightness distribution is desired to be obtained, the film thickness of each layer can be obtained from Equation (1) as follows.

$$A(n)=A_0(1/T^n) \quad (2)$$

Thus, an arbitrary brightness distribution can be obtained by controlling the layer thickness of the stacked films.

Figure 7A:
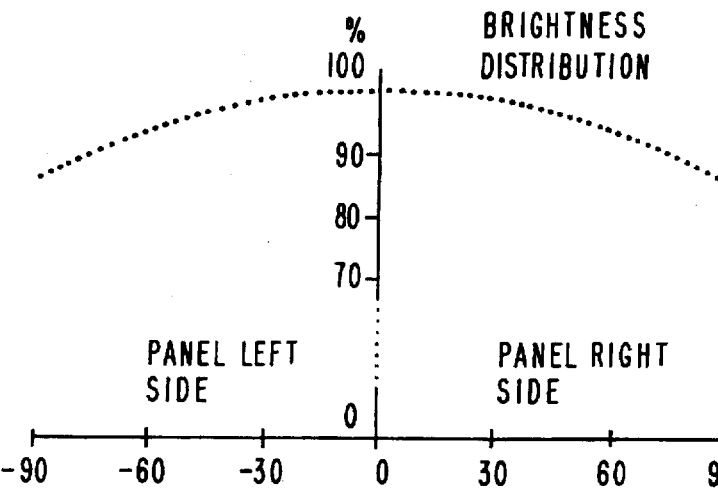
FIG. 7(a)–7(c) are diagrams showing an average layer thickness and a distribution of brightness.
Figure 7B:
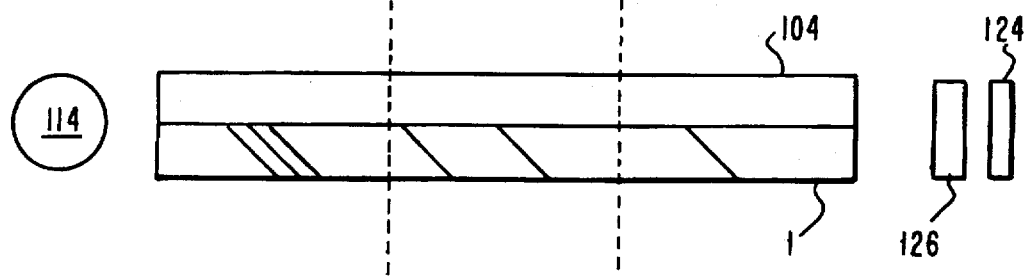
Figure 7C:
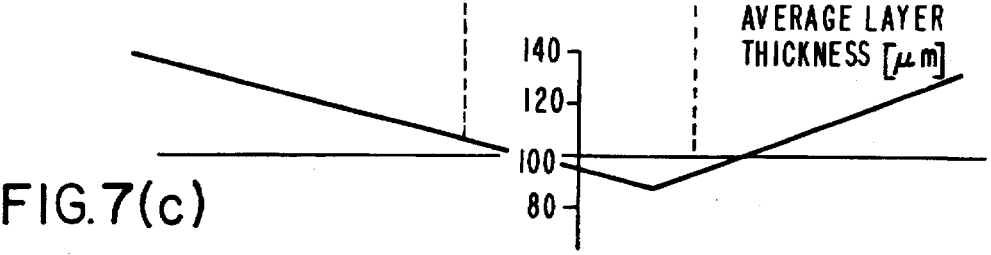

FIG. 7 shows a center mountain-shaped brightness distribution. Also, the main structure of the first embodiment is shown in FIG. 7(b), and a target brightness distribution is shown in FIG. 7(a). When the Liquid crystal display panel is divided at the center thereof into a left side range of 90 mm and a right side range of 90 mm and the center brightness is 100, the layer thickness of each stacked layer needs to be changed according to an average layer thickness shown by solid line in FIG. 7(C) to obtain a center mountain-shaped brightness distribution such as that shown in FIG. 7(a). In FIG. 7, the axis of abscissas represents the position of each film in the light guiding sheet and the axis of ordinates represents the average layer thickness.

While in FIG. 7 the layer thickness of the stacked films has been mainly described, a desired brightness distribution can also be obtained by changing the angle and refractive index of each film of the light guiding sheet 1 continuously or by stages.

Now, a liquid crystal display unit where the light guiding sheet of the embodiment of the present invention is attached directly to the array-side glass substrate of the liquid crystal display unit will be described as a third embodiment with reference to FIG. 8.

Figure 8:
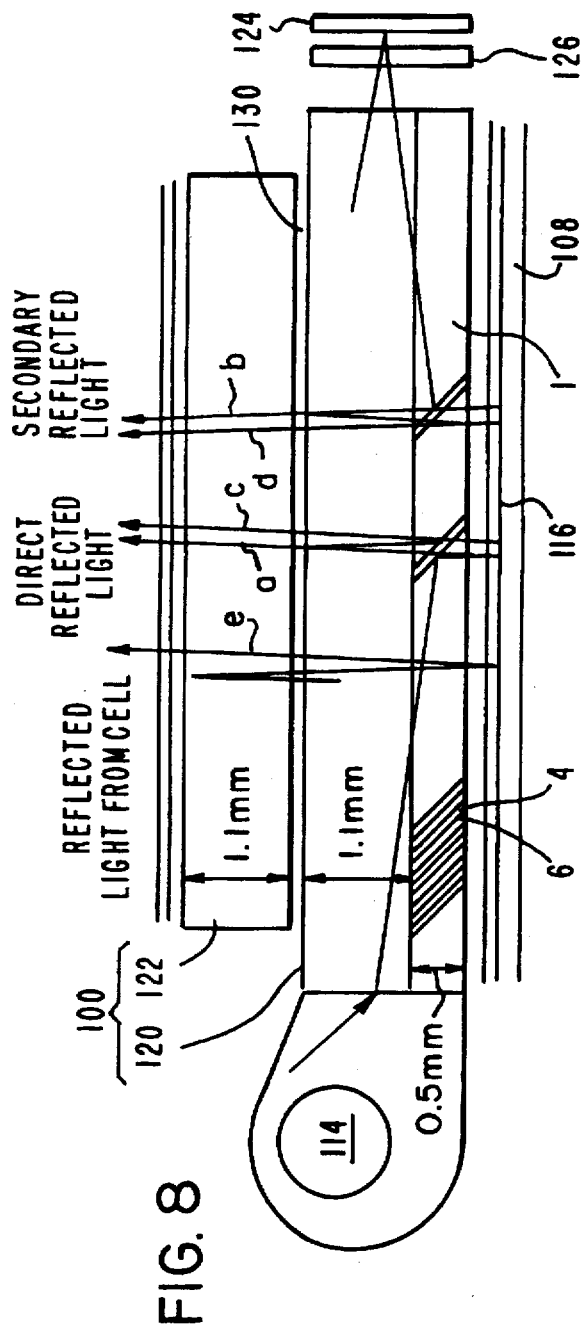
FIG. 8 is a diagram showing a back light of a third embodiment of the present invention.

The liquid crystal display unit shown in FIG. 8 does not have a conventional back light structure such as comprising a light guiding body and a prism sheet, and has a first characteristic in that a light guiding sheet 1 is attached directly to the array-side glass substrate of the liquid crystal display panel.

A back light structure using the light guiding sheet 1, which is the third embodiment of the present invention, will be described with FIG. 8. A liquid crystal display panel 100 comprises an array-side glass substrate 120 and a cell-side glass substrate 122 opposed to the array-side glass substrate 120 at a predetermined cell gap. The array-side glass substrate 120 is formed with a switching element, such as a thin-film transistor, and pixel electrodes. For the cell-side glass substrate 122, a color filter of three primary colors (read, green, and blue) is formed in correspondence with each pixel electrode, and between the color filters, there is formed a black matrix which is a light shielding layer. Between the array-side glass substrate 120 and the cell-side glass substrate 122 a liquid crystal 130 is enclosed.

The light guiding sheet 1 is attached to the surface (hereinafter referred to as a back surface) of the array-side glass substrate 120 opposite to the cell-side glass substrate 122. In this embodiment, the thicknesses of the array substrate and the cell is substrate are both about 1.1 mm, and the thickness of the light guiding sheet 1 is about 0.5 mm.

A line-shaped light source 114, for example, a cool cathode tube is attached to one end of the array-side glass substrate 120 and the light guiding sheet 1, and a reflecting plate 124 is attached to the other end through a λ/4 plate 126.

As shown in FIG. 8, each boundary surface between films 4 and 6, which are the stacked amorphous layer of the light guiding sheet 1, is attached to the back surface of the glass substrate 120 at an angle of 45° with respect to the surface of the glass substrate 120 in the direction from upper left to lower right so that the light reflected at the boundary surface is incident on a reflecting plate 108 attached to the back surface of the light guiding sheet 1 and then the reflected light is directed toward the glass substrate side of the liquid crystal display panel. Between the back surface of the light guiding sheet 1 and the light reflecting plate 108 a polarizing plate 116 is enclosed.

The refractive indexes of the stacked films of the light guiding sheet 1 are alternately 1.65 and 1.62. The refractive index of the glass substrate 120 is 1.60 slightly smaller than those of the stacked films of the light guiding sheet 1. The relationship between the refractive index of the glass substrate 120 and the refractive indexes of the stacked films of the light guiding sheet 1 is the same as the first embodiment.

Now, the operation will be described. The great part of the light, emitted from the light source 114, is incident on the glass substrate 120, and the remaining part is incident on the end face of the light guiding sheet 1. The light which propagates through the glass substrate 120 is refracted and incident on the light guiding sheet 1 whose refractive index is slightly greater, and then the light is reflected at the boundary surface of each film, passes through the polarizing plate 116, is reflected by the reflecting plate 108, again passes through the polarizing plate 116, and is incident on the glass substrate as S-polarized light (light path, a, of FIG. 8).

Then, the light propagating through the glass substrate 120 and the light guiding sheet 1 includes a large quantity of P-polarized light relatively, and the P-polarized light reaches the other end of the glass substrate 120 and the light guiding sheet 1, passes through the λ/4 plate 126, is reflected by the reflecting plate 124, again passes through the λ/4 plate 126, and returns into the glass substrate 120 and the light guiding sheet 1. At this time, since the light passes through the λ/4 plate 126 twice, it has been converted from P-polarized light into S-polarized light. The light converted to the S-polarized light is refracted and incident on the light guiding sheet 1 from the glass substrate 120, and then the light is reflected at the boundary surface of each film and emitted toward the glass substrate (light path, b, of FIG. 8).

Further, the light, which has reached the glass substrate 120 but reflected by the glass substrate 120, again travels through the glass substrate 120 and is again reflected toward the glass substrate 120 by the reflecting plate 108 (light paths, c and d, of FIG. 8).

Also, the light reflected at the cell-side glass substrate 122 again passes through the array-side glass substrate 120 and the light guiding sheet 1 and is reflected at the reflecting plate 108, and the reflected light again returns to the glass substrate 120 (light path, e, of FIG. 8).

Thus, since the light guiding sheet 1 has been directly attached to the glass substrate of the liquid crystal display panel and also the λ/4 plate 126 and the reflecting plate 124 have been attached to the end surface of the glass substrate 120, the quantity of the light that is vertically emitted from the surface of the glass substrate 120 can be increased and the light-guiding efficiency can be enhanced. Also, even when no prism sheet is used, the emission angle of the light from the liquid crystal display panel can be controlled so that a characteristic of visual angle is improved. Further, since the light guiding body is unnecessary, the back light region can be made thin.

Figure 9:
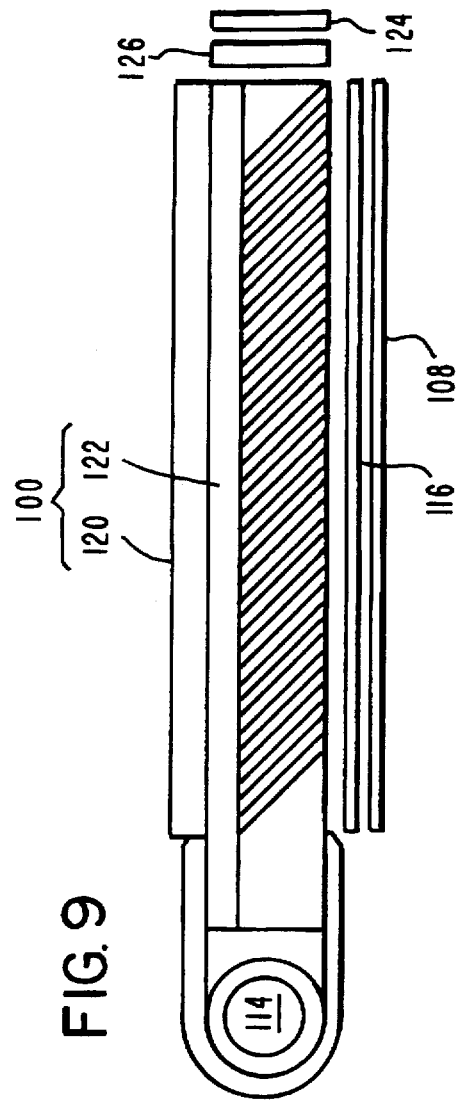
FIG. 9 is a diagram showing a back light of a fourth embodiment of the present invention.

Next, an embodiment where the back light is realized only by the light guiding sheet will be described as a fourth embodiment of the present invention with reference to FIG. 9. The liquid crystal display unit shown in FIG. 9 is different in that while the thickness of the light guiding sheet of the third embodiment of FIG. 8 has been 0.5 mm, the thickness of the light guiding sheet is thickened, for example, to about 5 mm. Since the light guiding sheet 1 is thickened so that the great part of the light of a light source 114 is directly incident from the end face of the light guiding sheet 1 and also the thickness of the light guiding sheet 1 is determined according to the size of the light source 114, there is no necessity of utilizing the glass substrate 120 as a light guiding body. This embodiment also has the advantage that the light-guiding efficiency can be enhanced and the thickness of the back light can be made extremely thin.

Figure 10:
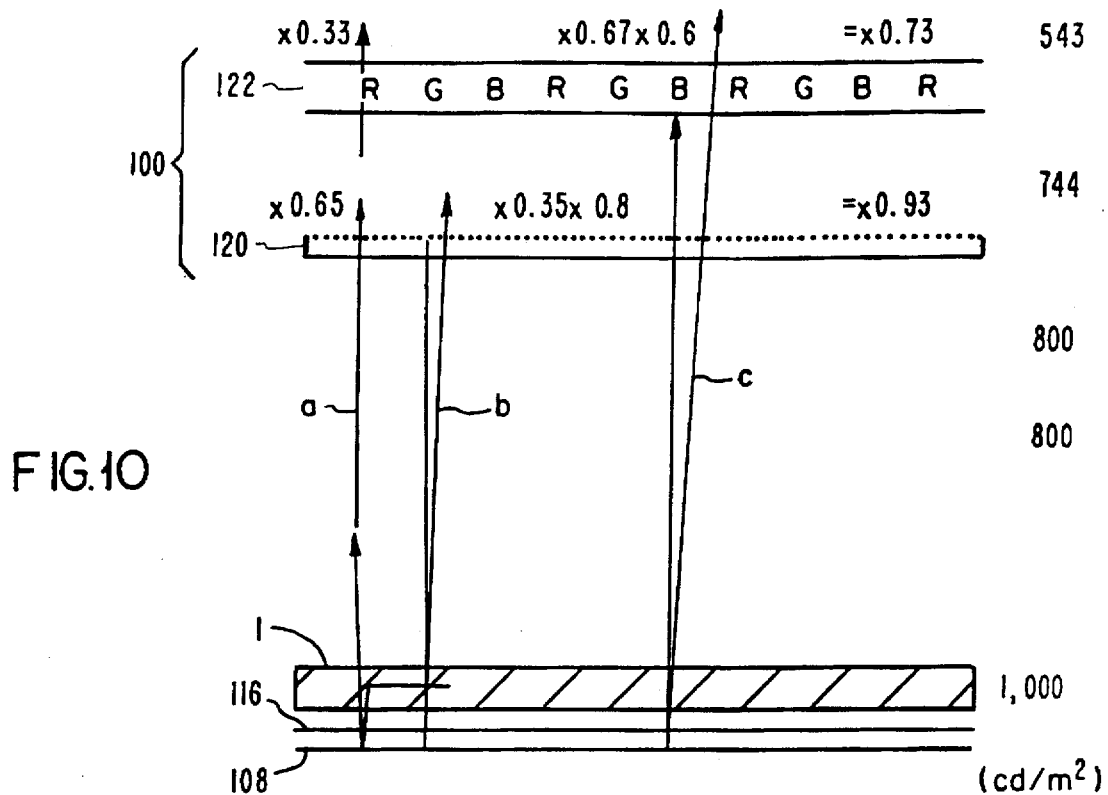
FIG. 10 is a diagram used to explain the display brightness of the liquid crystal display unit shown in FIG. 9.

The display brightness of the liquid crystal display unit shown in FIG. 9 will be described with FIG. 10.

If it is assumed that the quantity of the light propagating through the light guiding sheet 1 is 1000 cd/m², this light will pass through the polarizing plate 116, will be reflected by the reflecting plate 108, and will be emitted toward the glass substrate 120. At this time, if the light loss is assumed to be about 20%, the quantity of the light that is incident on the glass substrate 120 will be reduced to about 800 cd/m².

Next, within the liquid crystal display panel 100, about 65% of light (indicated by reference character, a, in FIG. 10) is transmitted due to the aperture efficiency (for example, 0.65) which is determined by a light shielding layer (black matrix) provided in the boundary between pixels, and about 35% of light (indicated by reference character, b, in FIG. 10) is reflected, again passes through the light guiding sheet 1 and through the polarizing plate 116, is reflected at the reflecting plate 108 and incident on the glass substrate 120.

Therefore, the total of the light that is incident on the glass substrate 120 becomes 800×(0.65+0.35×0.8)=800×0.93= 744 cd/m². Further, if the light passes through the cell-side glass substrate 122 where a color filter of three primary colors (red, blue, and green) for color display is formed, then the quantity of light will be reduced to 0.33 times. Also, since the light, which is reflected at the cell-side glass substrate 122 and is again reflected at the reflecting plate 108 and incident on the cell-side glass substrate 122, is assumed to be 60%, finally a light quantity of 744×(0.33+0.67×0.6) =744×0.73=543 cd/M² can be obtained.

With the back light using the light guiding sheet of this embodiment, a quantity of light can be increased by three times, as compared with 183 cd/m² obtained by the conventional back light structure, and also, a back light can be made extremely thin.

Next, an embodiment where the characteristic of visual angle of the liquid crystal display unit is improved with the light guiding sheet will be described with FIGS. 11 and 12.

Figure 11:
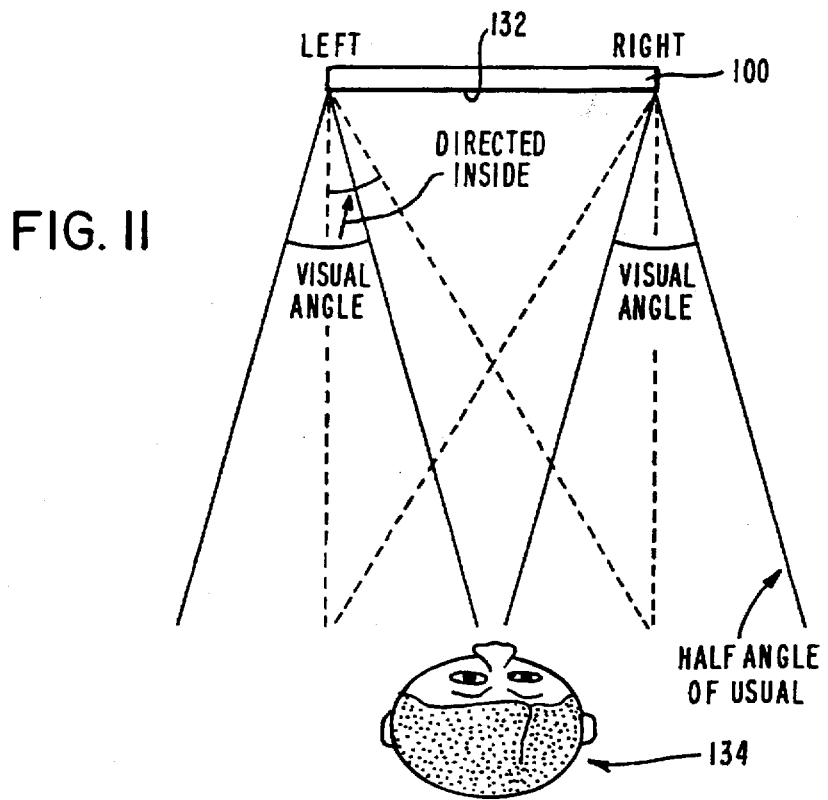
FIG. 11 is a diagram used to explain a characteristic of visual angle.

FIG. 11 shows the state where an observer 134 has looked at the display screen 132 of the liquid crystal display panel 100. The solid lines drawn from the left and right points of the panel 100 represent visual angles which are obtained at the left and right points, respectively, and the visual angles largely depend upon the direction of the light from a back light. In the case of the visual angles indicated by the solid lines of FIG. 11, both or either of the left and right regions would become dark even if the observer 134 moved his visual point slightly. Therefore, if the center of the visual angle is moved inside the display region, as shown by broken lines in FIG. 11, the region where the display of the display unit becomes dark could be reduced even if there were a certain degree of movement of the visual point of the observer 134.

Figure 12A:
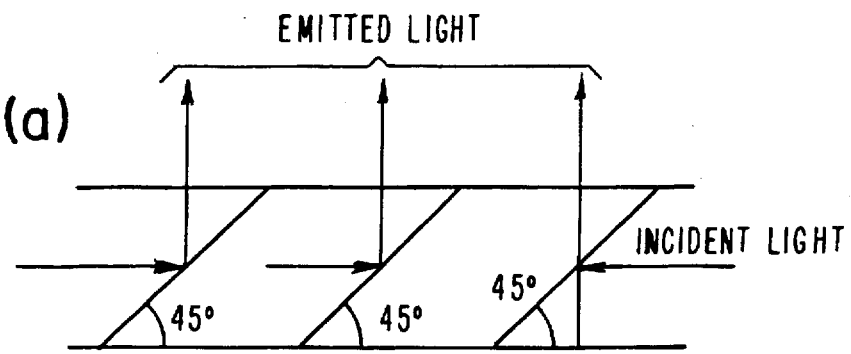
FIGS. 12(a)–12(b) are diagrams showing how the angle of the stacked film of the light guiding sheet is changed to improve a characteristic of visual angle.
Figure 12B:
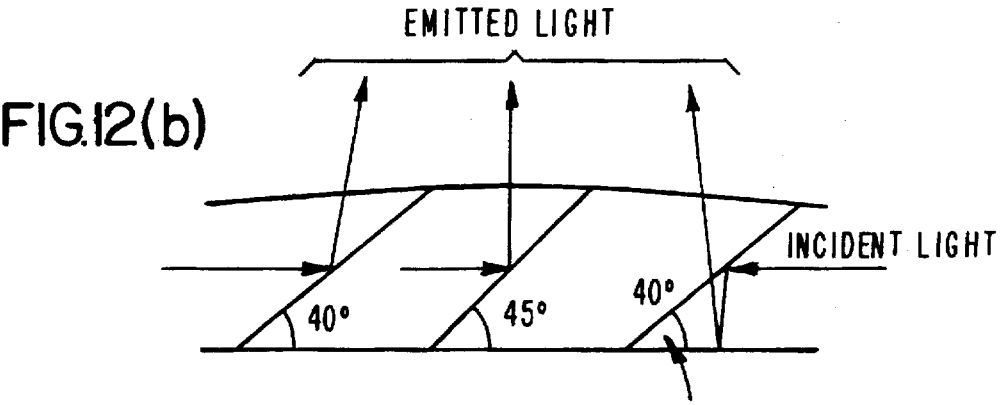
Figure 16:
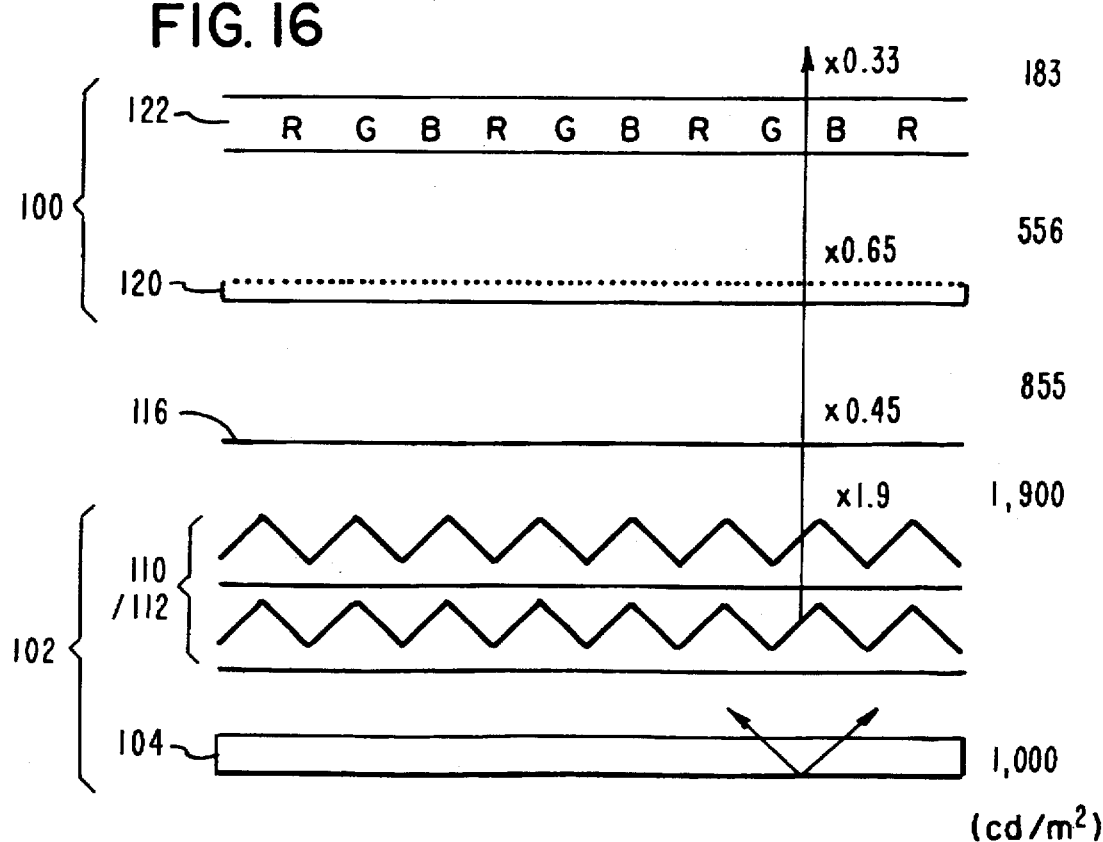
FIG. 16 is a diagram used to explain the display brightness of the conventional liquid crystal display unit.

In a case where the inclination of the stacked films of the light guiding sheet 1 is 45°, light is mainly emitted from the surface in the vertical direction, as shown in FIG. 12(a). In a case where the inclination of the left and right stacked films of the center is made small, the light from the left is emitted to the right and the light from the right is emitted to the left, as shown in FIG. 12(b). In order to form a light guiding sheet such as this, it can be formed by pressing it into a specified shape by utilizing that the inclination of the layer will become smaller if pressure is applied when the sheet is hardened at the time of the manufacturing of the sheet.

Thus, the visual angle characteristic can be improved by changing the angle of the stacked films of the light guiding sheet 1 by changing the position.

Now, a back light where the quantity of light is increased by effectively utilizing the back surface light of a light source by the light guiding sheet will be described with FIG. 13. The back surface light of a light source means the light which is directed toward the cover side (not shown) of the light source in the direction opposite to the direction where light is incident directly on the light guiding body (or array-side glass substrate) or the light guiding sheet.

As shown in FIG. 13(a), a transparent film 140, where the refractive index is 1.6 and the thickness is 1.0 mm or so, is formed around a line-shaped light source 114, and the light guiding sheet 1 of the above-described embodiment is attached to the outer surface of the transparent film 140. A reflecting sheet 144 is wound on the outer periphery of the light guiding sheet 1. The upper and lower end faces of the light guiding sheet 1 and the upper and lower end faces of the transparent film 140 are connected to the array-side glass substrate of the liquid crystal display unit, or the light guiding body or light guiding sheet located in the lower surface of the glass substrate.

As shown in FIG. 13(b), the angle of each of the stacked films of the light guiding sheet 1 is set to about 60° relative to the transparent film 140. The light incident on the transparent film 140 as back surface light is incident on the light guiding sheet 1 and reflected at each stacked film. The reflected light reaches the reflecting film 144, and is reflected by the film 144 and again is incident on the transparent film 140. Most of the light incident on the transparent film 140 are reflected within the transparent film 140 and reach the upper end face of the film 140. Then, the light is incident on the light guiding body or light guiding sheet.

If the periphery of the light source 114 is thus constructed with the light guiding sheet, a quantity of light will be increased by utilizing back surface light which could not be utilized in prior art.

As described above, according to the embodiments, the light-guiding efficiency of the light guiding body portion of the back light can be enhanced and the utilization efficiency of the back surface light of a lamp of the back light can be enhanced. Also, the emission angle of the light from the liquid crystal display panel can be controlled so that a characteristic of visual angle is improved. Also, the back light can be made extremely thin by supplying direct light to the glass substrate of the liquid crystal display unit without the light guiding body of the back light.

The present invention is not limited to the embodiments given herein but various changes and modifications will be possible. For example, while the transparent film 140 and the light guiding sheet 1 have been arranged around a light source in the recited order to effectively utilize the back surface light of the light source, the same advantage could be obtained even if the light guiding sheet 1 and the transparent film 140 were arranged in the recited order.

As has been described hereinbefore, the present invention is constructed so that the light from a light source can be efficiently transmitted to the panel of a liquid crystal display unit and the back light can be made thin.

We claim:

1. A back light, comprising:
   a stack of two or more kinds of transparent amorphous layers having different refractive indices, said stack having two opposed major surfaces formed by the side surfaces of said amorphous layer and said transparent amorphous layers being inclined at a predetermined angle with respect to one of said major surfaces; and
   means for bringing light into said stack for transmission of said light in a longitudinal direction of said stack along and between said major surfaces in a direction that intersects a multiplicity of successive ones of said transparent amorphous layers, said light being partly transmitted through a multiplicity of successive interfaces between said transparent amorphous layers and partly reflected at each of said successive interfaces in order to distribute reflected light along said stack, said light having a P-polarized component and an S-polarized component, said reflected light at said successive interfaces being emitted through one of said major surfaces and being a reflected portion of the S-polarized component, said transmitted light at each of said successive interfaces being a transmitted portion of the S-polarized component and the P-polarized component.

2. The back light as set forth in claim 1, wherein a thickness of each of said amorphous layers has a predetermined layer thickness distribution in a stacked direction of said amorphous layers.

3. The back light as set forth in claim 2, wherein said layer thickness distribution is a layer thickness distribution such that an intensity distribution of said light emitted through said one major surface becomes mountainous with a center of said one major surface as a mountaintop.

4. The back light as set forth in claim 2, wherein said layer thickness distribution is a layer thickness distribution such that a strength distribution of said light emitted through said one major surface becomes flat.

5. The back light as set forth in claim 1, wherein the maximum layer thickness of said amorphous layers is 200 μm or less.

6. The back light as set forth in claim 1, wherein said predetermined angle has a predetermined angle distribution for each of said amorphous layers.

7. The back light as set forth in claim 6, wherein said predetermined angle distribution is a distribution where an angle of a central portion of said one major surface and an angle of a peripheral portion of said one major surface are different.

8. The back light as set forth in claim 1, wherein said amorphous layers have a distribution of diffractive indices of 1.1 to 3.0.

9. A back light as set forth in claim 1 wherein said means for bringing light into said stack comprises:
   a light source provided at one end of said stack.

10. The back light as set forth in claim 9, wherein
    an angle of each of said amorphous layers is an angle which causes light from said light source to be reflected directly to a liquid crystal display panel side;
    a first reflecting plate is attached to one of said major surfaces of said stack opposite to said liquid crystal display panel side; and
    a λ/4 plate and a second reflecting plate are provided at another end of said stack in the recited order.

11. The back light as set forth in claim 9, wherein
    an angle of each of said amorphous layers is an angle which does not cause light from said light source to be reflected directly to a liquid crystal display panel side;
    a polarizing plate and a first reflecting plate are attached to one of said major surfaces of said stack opposite to said liquid crystal display panel side in the recited order; and
    a λ/4 plate and a second reflecting plate are provided at another end of said stack in the recited order.

12. The back light as set forth in claim 9, wherein a light guiding body is provided on said liquid crystal display panel side of said stack.

13. The back light as set forth in claim 12, wherein a transparent substrate of said liquid crystal display panel acts as said light guiding body.

14. The back light as set forth in claim 9, wherein the periphery of the light source is surrounded by the stack.

15. A liquid crystal display unit provided with the back light as set forth in claim 9.

* * * * *